United States Patent
Nijsen et al.

(10) Patent No.: US 8,505,985 B2
(45) Date of Patent: Aug. 13, 2013

(54) COUPLING DEVICE

(75) Inventors: Andreas Jacobus Louis Nijsen, Enschede (NL); Leonardus Henricus Wilhelmus Giesen, Enschede (NL)

(73) Assignee: Georg Fischer Waga N.V., Epe (NL)

( * ) Notice: Subject to any disclaimer, the term of this patent is extended or adjusted under 35 U.S.C. 154(b) by 0 days.

(21) Appl. No.: 13/262,334

(22) PCT Filed: Mar. 25, 2010

(86) PCT No.: PCT/NL2010/050153
§ 371 (c)(1),
(2), (4) Date: Nov. 22, 2011

(87) PCT Pub. No.: WO2010/114366
PCT Pub. Date: Oct. 7, 2010

(65) Prior Publication Data
US 2012/0061956 A1    Mar. 15, 2012

(30) Foreign Application Priority Data
Mar. 30, 2009  (NL) ..................................... 2002683

(51) Int. Cl.
*F16L 21/06* (2006.01)
(52) U.S. Cl.
USPC ............................ 285/421; 285/323; 285/343
(58) Field of Classification Search
USPC ........................... 285/342, 343, 339, 323, 421
See application file for complete search history.

(56) References Cited

U.S. PATENT DOCUMENTS

| | | | | |
|---|---|---|---|---|
| 2,440,178 | A * | 4/1948 | Lofquist, Jr. | 285/249 |
| 2,460,653 | A * | 2/1949 | Raybould | 285/341 |
| 5,188,401 | A | 2/1993 | Staniforth | |
| 5,317,799 | A * | 6/1994 | Chapman et al. | 285/256 |
| 6,257,628 | B1 * | 7/2001 | Nijsen | 285/323 |
| 6,533,331 | B2 * | 3/2003 | Hulsebos et al. | 285/323 |
| 6,843,514 | B2 * | 1/2005 | Rex et al. | 285/323 |
| 7,837,239 | B2 * | 11/2010 | Krausz et al. | 285/323 |
| 8,091,932 | B2 * | 1/2012 | Nijsen | 285/323 |
| 2003/0085566 | A1 | 5/2003 | Rex et al. | |

FOREIGN PATENT DOCUMENTS

| | | |
|---|---|---|
| EP | 794378 A2 | 9/1997 |
| EP | 1906073 A1 | 4/2008 |
| EP | 2090815 A2 | 8/2009 |

OTHER PUBLICATIONS

International Preliminary Report on Patentability dated Jul. 15, 2011, in counterpart Application No. PCT/NL2010/050153, filed Mar. 25, 2010.

* cited by examiner

*Primary Examiner* — David E Bochna
(74) *Attorney, Agent, or Firm* — Kinney & Lange, P.A.

(57) ABSTRACT

Disclosed herein is a coupling device for a tube comprising a sleeve part for receiving a part of the tube, and a sealing organ which is arranged to provide a seal around the tube as it is at least partially inserted into the sleeve part, wherein the sealing organ comprises a rubber ring of which at least a first portion is placed between the tube and the elements and a second portion is placed between the elements and the sleeve part, wherein the elements are provided with circumferentially extending cooperating tongue and groove connections, which are positioned at the sides of the elements facing the second portion of the rubber ring that lies adjacent to the sleeve part.

5 Claims, 4 Drawing Sheets

COUPLING DEVICE

BACKGROUND

The invention relates to a coupling device for a tube comprising a sleeve part for receiving a part of the tube, and a sealing organ which is arranged to provide a seal around the tube as it is at least partly inserted into the sleeve part, wherein the sealing organ comprises a plurality of elements that form part of a substantially closed ring, and wherein the sealing organ further comprises a rubber ring of which at least a first portion is placed between the tube and the elements and a second portion is placed between the elements and the sleeve part.

Such a coupling device is known from one of the applicant's earlier inventions as disclosed in EP-A-0 794 378.

The known coupling device is provided with a sealing organ that comprises a plurality of slidably abutting elements which form part of a substantially closed ring. In a preferred embodiment of the known device each element is provided with a notch on a first side and a projection on a second side of the element opposite to the first side, which notch and projection are suitable for interaction with a corresponding projection, respectively notch of an abutting element. In this way a defined positioning of each of the elements of the ring is secured.

The ring of abutting elements according to EP-A-0 794 378 is intended to co-operate with a rubber ring for providing a tightly sealed closure between the tube and the elements.

It is an object of the instant invention to further improve the coupling device known from EP-A-0 794 378, and to provide such a coupling device which secures a gastight seal not only between the sealing organ and the tube but specifically also between the sealing organ and the sleeve part.

SUMMARY objectives, in accordance with the invention a coupling device is proposed having the features of one or more of the appended claims.

In a first aspect of the invention the coupling device has the feature that the elements are provided with cooperating tongue and groove connections at their sides facing the second portion of the rubber ring that lies adjacent to the sleeve part, and that the tongues and grooves of the tongue and groove connections are dimensioned with a length in the tangential direction which amounts to at least one and a half times the width of these connections as seen in the radial direction of the coupling.

This arranges that neighbouring elements of the coupling device which are linked through said groove and tongue connections exhibit a tremendous flexibility that allows the coupling device to accommodate a large variety of curvatures of tubes and a large variety of tube diameters, without compromising the sealing properties of the coupling device of the invention.

The tongue and groove connections project substantially parallel to the tube's surface, i.e. circumferentially around the tube instead of in the tube's longitudinal direction. Further the just mentioned aspect in combination with the preferred feature that each tongue is supported by the corresponding groove's bottom surface provides that at all practical circumstances and with variable tube-diameters, the elements can secure an effective sealing at the side facing the sleeve part of the coupling device, in addition to the sealing at the side facing the tube.

It is specifically remarked that it may be advantageous for promoting a gas tight seal to employ several tongue and groove connections in parallel to each other, which means that these parallel tongue and groove connections are provided on neighbouring elements of the coupling device, albeit at a different distance in relation to the center of the coupling device.

In order to facilitate and promote an effective sealing, particularly where the sealing organ acts on the sleeve part of the coupling device, it is preferable that the tongue and groove connections are arranged to allow that the elements assume positions wherein in said positions neighbouring elements can have a variable distance with respect to each other, and that in any such position there is at least one contact-point between the second portion of the rubber ring that lies adjacent to the sleeve part, and one or more elements or parts thereof, as seen in all radial directions covering the entire circumference of the sealing organ. This arranges that the rubber ring effectively seals off circumferentially against the sleeve part of the coupling device.

For a secured cooperation between the tongues and grooves of the neighbouring elements it may be beneficial that the tongue and groove connections are arranged as snap-in connections.

The invention will hereinafter be further elucidated with reference to the drawing of a exemplary embodiment of the coupling device of the invention.

BRIEF DESCRIPTION OF THE DRAWINGS

In the drawing.

Wherever in the figures the same parts are shown these parts are referred to with the same reference numerals.

DETAILED DESCRIPTION

Figure 1:
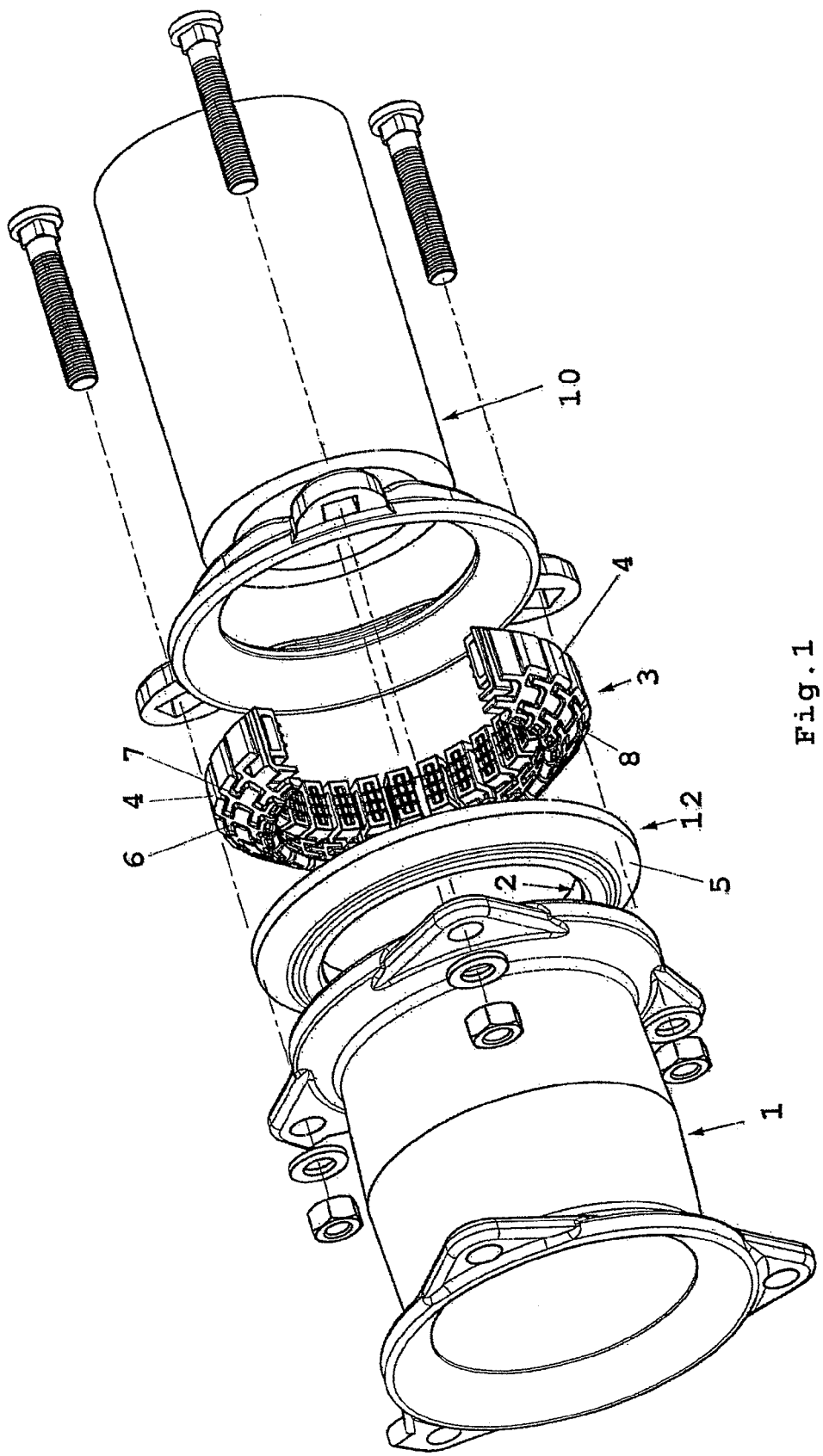
FIG. 1 shows a coupling device of the invention in exploded view.

With reference first to FIG. 1 an exploded view of the coupling device of the invention is shown which is intended for coupling a tube 10 to a sleeve part 1. For this purpose the tube 10 can at least in part be received in the sleeve part 1.

For securing an effective seal the coupling device is further provided with a sealing organ 3, 12, comprising a rubber ring 12 and a ring 3 of pressing elements 4 which inter alia is arranged to provide a seal around the tube 10 at the moment this tube 10 is at least partly inserted into the sleeve part 1.

The sealing organ 3, 12 is in accordance with the invention further intended to provide a gastight seal between the ring 3 of elements 4 and the sleeve part 1.

In accordance with the prior art the sealing organ 3 of the invention comprises a plurality of elements 4 that form part of a substantially closed ring. Furthermore, as mentioned above the sealing organ 3, 12 comprises a rubber ring 12 of which at least a first portion 2 that in the mounted position of the coupling device, is placed between the tube 10 and the elements 4. Likewise a second portion 5 of the rubber ring 12 is in the mounted position of the coupling device placed between the elements 4 and the sleeve part 1.

It is to be understood that the coupling device of the invention particularly provides a solution for the problem that leakages may occur when the coupling device is applied with different diameters of tubes 10 or sleeve parts 1 and in accordance with the prior art EP-A-0 794 378 an effective solution is proposed to secure an effective coupling between the tubes 10 on the one part and the sleeve part 1 on the other part, whenever such varying diameters occur. The solution for such situations as disclosed in EP-A-0 794 378 is considered to be fully inserted and incorporated herein.

Now, in order to effect an effective gastight seal between the ring 3 of elements 4 and the sleeve part 1, the invention teaches that the elements 4 are provided with cooperating tongue 6 and groove 7 connections, which tongues 6 are part of a first element and which grooves 7 are part of a second element, whereby the first element and the second element are neighbouring elements.

The said tongue 6 and groove 7 connections are provided in said elements 4 at the sides 8 that face in use the second portion 5 of the rubber ring 12 that lies, in the mounted condition of the coupling device, adjacent to the sleeve part 1. This is all very clear from the exploded view of the coupling device shown in FIG. 1.

Figure 2:
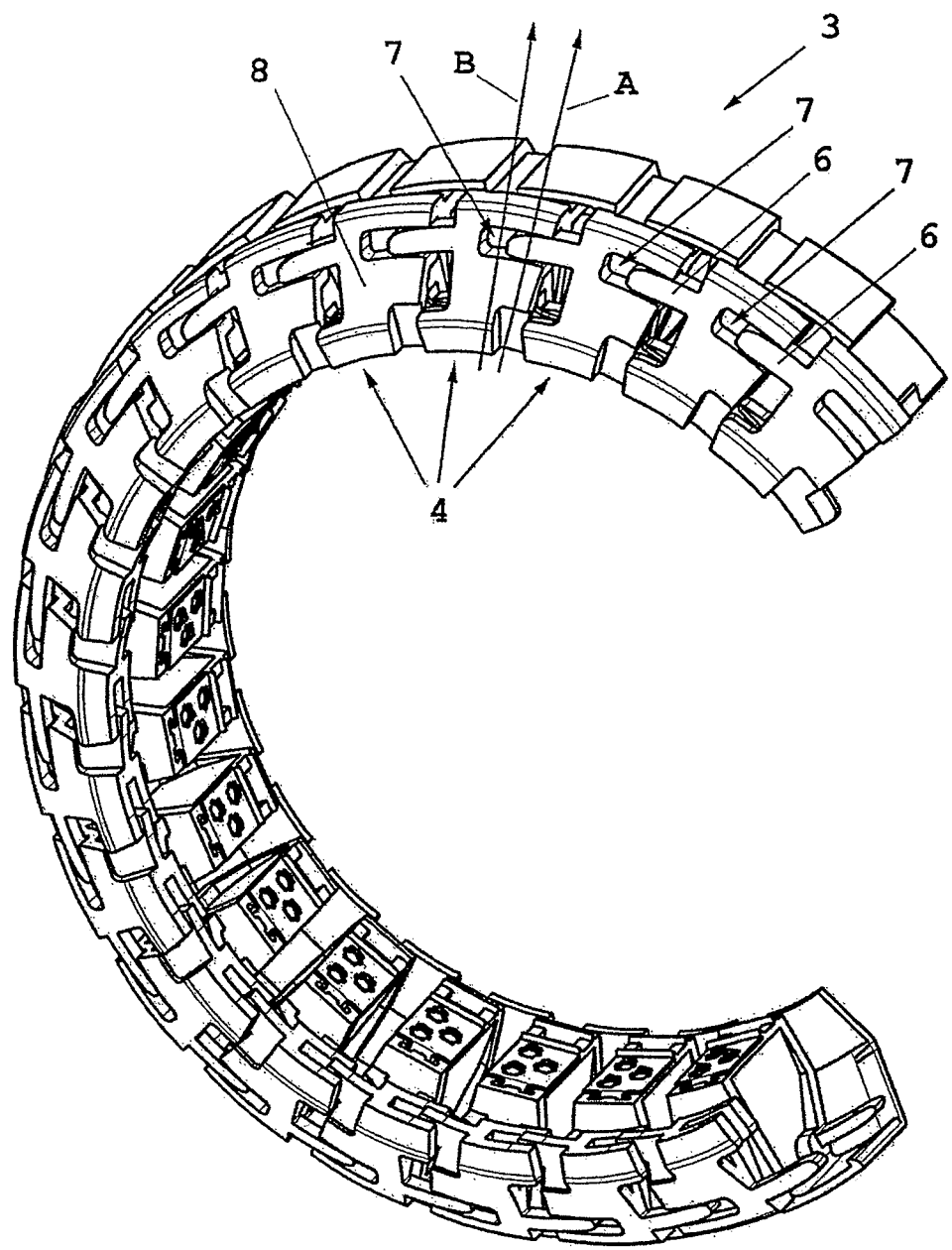
FIG. 2 and FIG. 3 show a section of a ring of elements that form part of a sealing organ in a first position (FIG. 2) and in a second position (FIG. 3)
Figure 3:
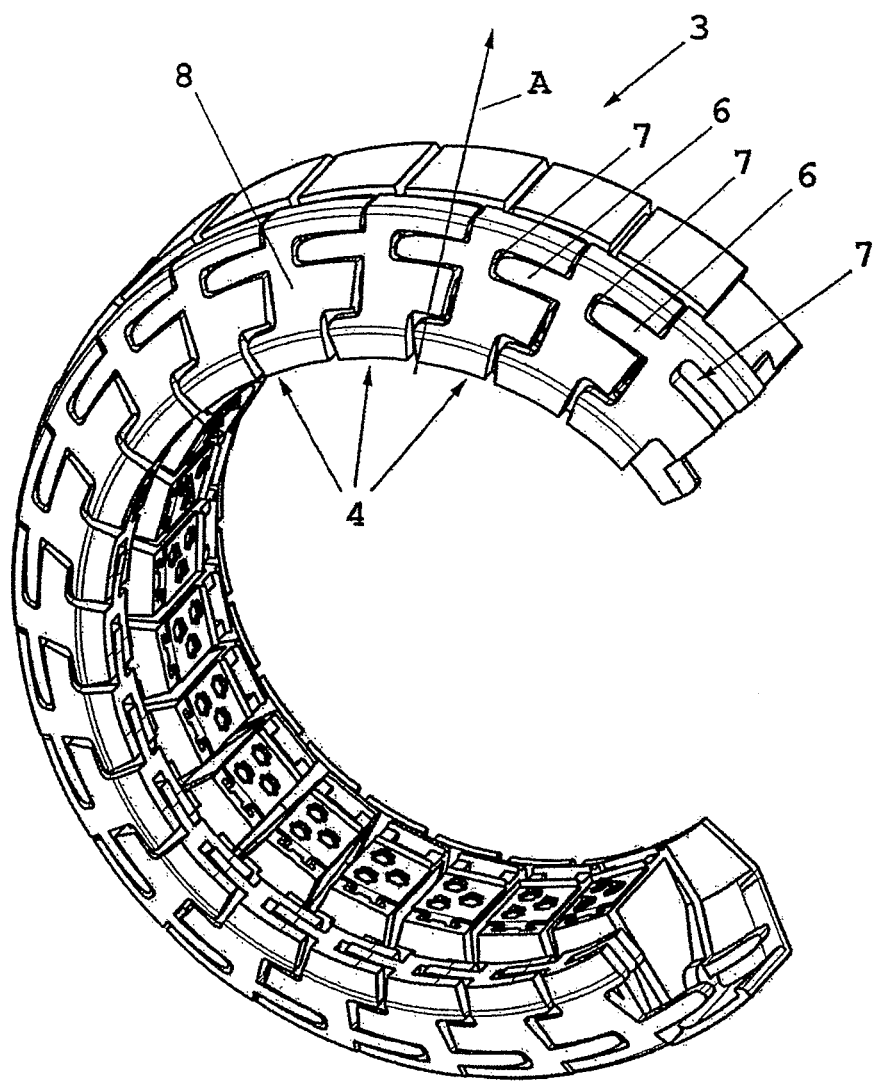

FIG. 2 and FIG. 3 show the ring 3 of elements 4 separate from the other parts of the coupling device giving a clear picture of the cooperating tongue 6 and groove 7 connections at said sides 8 that in use face the second portion of the rubber ring 12 that lies adjacent to the sleeve part 1.

FIG. 2 shows the ring 3 wherein the respective elements 4 that collectively form the ring 3 are at a first position in which the elements 4 are relatively far apart from each other. Thus, the diameter of ring 3 is increased to suit the ring 3 to be applied for use with tubes and/or sleeve parts of a relatively large diameter.

FIG. 3 on the other hand shows the same ring 3 of elements 4 having as many elements as the ring 3 shown in FIG. 2, the only difference being that the series of elements 4 all occupy a second position in which the mutual distances of the elements 4 is reduced to their lowest possible value. In this situation the ring 3 has a diameter that matches the smallest diameter tubes and/or sleeve parts with which this ring of elements may be used in the coupling device of the invention.

Now what FIG. 3 in comparison with FIG. 2 further shows is that the tongue 6 and groove 7 connections are arranged to allow that the elements 4 assume variable positions wherein in said positions the neighbouring elements 4 can have a variable distance with respect to each other.

In order to have the coupling device of the invention suited to accommodate a large variety of tube shapes and tube dimensions, it is preferred that the tongues 6 and grooves 7 of the tongue and groove connections are dimensioned with a length in the tangential direction which amounts to at least one and a half times the width of these connections as seen in the radial direction of the coupling device. With reference to the tongue 6 its length in the tangentional direction corresponds to the length of this tongue as it extends from the body of the element 4 from which it forms a part. With reference to the groove 7 its length in the tangentional direction corresponds to the length of the opening provided in the body of the element 4 from which it forms a part. The width of either the tongue 6 or the groove 7 is the width as measured along the line A as shown in FIG. 2 and FIG. 3.

However, whatever the tube shape or tube dimension is, in each of said positions as shown in FIG. 2 and FIG. 3, respectively, there is always a contact point present as seen in any radial direction of the ring 3 forming part of the sealing organ 3, 12 (also see FIG. 1). One of such contact lines is indicatively shown in FIGS. 2 and 3, respectively, and indicated with A. When going in the radial direction of the line A there is at all times at least one contact point between one or more of the elements 4 or a part thereof and the rubber ring thus securing that there is a gastight seal present between the ring 3 of elements 4 and the sleeve part 1 of the coupling device.

Likewise the line B shown in FIG. 2 indicates that in another radial direction of the ring 3 forming part of the sealing organ 3, 12, wherein the tongue 6 and groove 7 are not completely shifted into each other but leave an open part, there still is secured along said line B at least one contact point and in fact many contact points between one or more of the elements 4 of the ring 3 and the rubber ring which for clarity purposes is not shown in FIG. 2.

Figure 4:
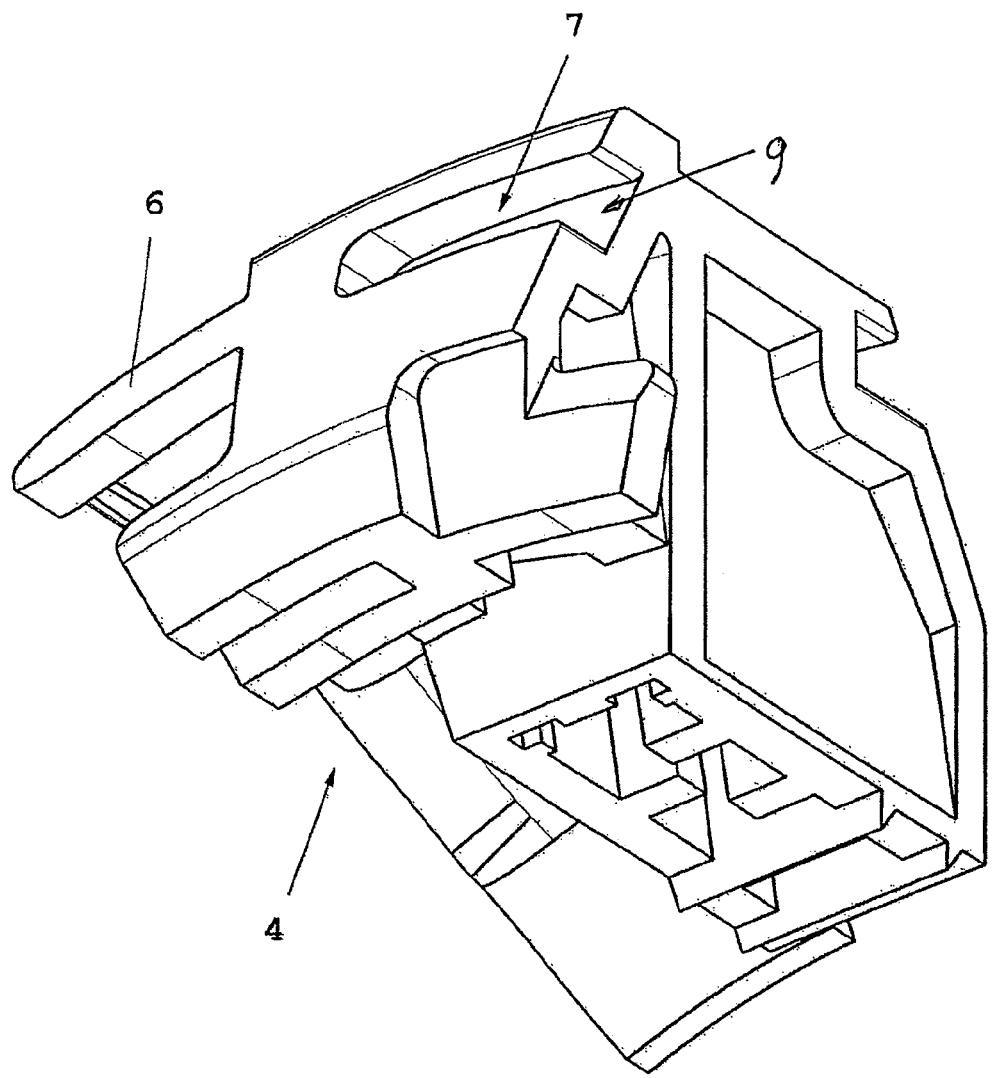
FIG. 4 shows a separate element of the ring shown in FIGS. 2 and 3, respectively.

For improved clarity and further explanation of the invention FIG. 4 finally shows a separate element 4 that forms part of a ring 3 of elements as shown in FIGS. 1, 2 and 3, respectively.

FIG. 4 clearly shows that the element 4 is at a first side provided with a tongue 6 and on a second side provided with a groove 7. The said tongue 6 and groove 7 are arranged at a position and are provided with a shape and dimensions that makes them suitable for cooperation with a groove and tongue of a neighbouring element 4 thus allowing that a ring 3 of such elements 4 can easily be assembled. FIG. 4 further shows that in accordance with the invention the groove 7 is provided with a bottom surface 9 for support of the corresponding tongue 6 that is received in said groove 7. This bottom surface 9 of the groove 7 is a very effective means to have the tongue 6 maintain pressure at all circumstances against the rubber ring 12, and provide an effective seal at the sides 8 (see FIGS. 1-3) of the elements 4 that face the rubber ring 12 at the portion 5 that lies adjacent to the sleeve part 1.

It is explicitly remarked that many variations to the tongue and groove connection forming part of the elements of the coupling device of the invention are feasible without departing from the inventive scope as embodied in the appended claims. As an example which is not shown in the drawing, it can be mentioned that the coupling device of the invention may be embodied with several tongue and groove connections in parallel to each other, which are provided on neighbouring elements and at mutually different distances in relation to the center of the coupling device. The claims are therefore not to be considered restricted to the specific embodiment shown in the example. This example only serves to elucidate and remove any ambiguity concerning the claims.

The invention claimed is:

1. A coupling device for a tube comprising a sleeve part for receiving a part of the tube, and a sealing organ which is arranged to provide a seal around the tube as it is at least partly inserted into the sleeve part, wherein the sealing organ comprises a plurality of elements that form part of a substantially closed ring, and wherein the sealing organ further comprises a rubber ring of which at least a first portion is placed between the tube and the elements and a second portion is placed between the elements and the sleeve part, wherein the elements are provided with cooperating tongue and groove connections which annularly extend near the closed ring's outer circumference and are positioned at the sides of the elements facing the second portion of the rubber ring that lies adjacent to the sleeve part, and that each of the tongues and grooves of the tongue and groove connections are dimensioned with a length in the tangential direction, which amounts to at least one and a half times the width of each of the tongues and grooves of these connections as seen in the radial direction of the coupling looking from a longitudinal axis of the coupling device transversely to the tangential direction.

2. A coupling device according to claim 1, wherein the tongue and groove connections are arranged to allow that the elements assume positions wherein in said positions neighboring elements can have a variable distance with respect to each other, and that in any such position there is at least one contact-point between the second portion of the rubber ring and one or more elements or parts thereof, as seen in all radial directions covering the entire circumference of the sealing organ.

3. A coupling device according to claim 1, characterized in that and that each tongue is supported by a bottom surface in the corresponding groove.

4. A coupling device according to claim 1, comprising several tongue and groove connections in parallel to each other, which are provided on neighboring elements and at mutually different distances in relation to the center of the coupling device.

5. A coupling device according to claim 1, wherein the tongue and groove connections are arranged as snap-in connections.

* * * * *

UNITED STATES PATENT AND TRADEMARK OFFICE
CERTIFICATE OF CORRECTION

PATENT NO. : 8,505,985 B2
APPLICATION NO. : 13/262334
DATED : August 13, 2013
INVENTOR(S) : Andreas Jacobus Louis Nijsen and Leonardus Henricus Wilhelmus Giesen It is certified that error appears in the above-identified patent and that said Letters Patent is hereby corrected as shown below:

In the Specification

Col. 1, Line 35
  Insert --SUMMARY--

Col. 1, Line 35
  Delete "SUMMARY"
  Insert --In order to provide a coupling device that can meet these--

Signed and Sealed this
Twenty-sixth Day of November, 2013

Margaret A. Focarino
*Commissioner for Patents of the United States Patent and Trademark Office*